United States Patent
Grimes et al.

(10) Patent No.: US 7,668,189 B1
(45) Date of Patent: Feb. 23, 2010

(54) ADAPTIVE TRANSPORT PROTOCOL

(75) Inventors: Kevin Lloyd Grimes, Fishers, IN (US); Kevin Elliot Bridgewater, Indianapolis, IN (US); Gregory George Tamer, Indianapolis, IN (US); Thomas Edward Horlander, Indianapolis, IN (US); Todd Goosman, Indianapolis, IN (US); Terry Wayne Lockridge, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 09/427,388

(22) Filed: Oct. 26, 1999

Related U.S. Application Data

(60) Provisional application No. 60/142,849, filed on Jul. 8, 1999.

(51) Int. Cl.
*H04L 12/28* (2006.01)
*H04L 12/56* (2006.01)
*H04J 3/16* (2006.01)

(52) U.S. Cl. ...................... 370/419; 370/464

(58) Field of Classification Search ............... 370/312, 370/313, 349, 352, 354, 360, 368, 371, 374, 370/379, 381, 382, 383, 389, 395.1, 395.5, 370/395.52, 395.6, 437, 464–466, 467, 471, 370/496; 348/553, 571
See application file for complete search history.

(56) References Cited

U.S. PATENT DOCUMENTS

| | | | |
|---|---|---|---|
| 4,586,128 A * | 4/1986 | DeWoskin .................. 710/113 |
| 5,245,429 A * | 9/1993 | Virginio et al. ........ 375/240.25 |
| 5,280,479 A | 1/1994 | Mary |
| 5,410,709 A * | 4/1995 | Yu ............................. 710/269 |
| 5,666,487 A | 9/1997 | Goodman et al. |
| 5,671,253 A | 9/1997 | Stewart ...................... 375/316 |
| 5,717,471 A | 2/1998 | Stewart ...................... 348/726 |
| 5,724,410 A * | 3/1998 | Parvulescu et al. ....... 379/88.18 |
| 5,737,495 A | 4/1998 | Adams et al. |
| 5,768,539 A | 6/1998 | Metz et al. |
| 5,826,017 A * | 10/1998 | Holzmann .................. 709/230 |
| 5,933,500 A * | 8/1999 | Blatter et al. ............... 380/200 |
| 5,936,962 A * | 8/1999 | Haddock et al. ............ 370/446 |

(Continued)

FOREIGN PATENT DOCUMENTS

EP    0 613 274 A2    8/1994

(Continued)

OTHER PUBLICATIONS

Anonymous: "Stream Scheduler for MPEG-2 Transport Stream Multiplexer", Research Disclosure. vol. 513, No. 127, Sep. 1, 1998, XP002262616, Havant, UK, article No. 413127.

(Continued)

*Primary Examiner*—Kevin C Harper
(74) *Attorney, Agent, or Firm*—Robert D. Shedd; Paul P. Kiel

(57) ABSTRACT

An adaptive transport protocol decoder includes a source of a stream of packets, each including a payload, and having a first transport protocol, and a source of a stream of packets, each including a payload, and having a second transport protocol. A protocol decoder, coupled to the first and second packet stream sources, extracts the respective payloads from the packets from a selected one of the first and second packet stream sources.

11 Claims, 5 Drawing Sheets

U.S. PATENT DOCUMENTS

| | | | |
|---|---|---|---|
| 5,982,411 A * | 11/1999 | Eyer et al. | 725/49 |
| 6,157,673 A * | 12/2000 | Cuccia | 375/240 |
| 6,233,389 B1 * | 5/2001 | Barton et al. | 386/46 |
| 6,356,950 B1 * | 3/2002 | Tillmann et al. | 709/246 |
| 6,430,236 B1 * | 8/2002 | Funakoshi | 375/340 |
| 2001/0056576 A1 * | 12/2001 | Park et al. | 725/48 |
| 2003/0026280 A1 * | 2/2003 | Mansouri et al. | 370/429 |

FOREIGN PATENT DOCUMENTS

| | | |
|---|---|---|
| WO | WO96/31068 | 10/1996 |
| WO | WO 97/28652 | 8/1997 |
| WO | WO 98/16046 | 4/1998 |
| WO | WO98/41011 | 9/1998 |

OTHER PUBLICATIONS

European Search Report.

* cited by examiner

ADAPTIVE TRANSPORT PROTOCOL

This is a non-provisional application originating from a provisional application Ser. No. 60/142,849, filed Jul. 8, 1999.

The present invention relates to a transport packet decoder which adaptively decodes packets having differing transport protocols.

Currently, digital signals carrying programming, such as video/audio/data programming, are supplied to consumers from different providers in respectively different formats, called protocols. For example, direct satellite system (DSS) signals are formatted in a proprietary format owned by DirecTV, and all signals carrying programming supplied via DSS satellites are formatted using that protocol. Similarly, local terrestrial high definition television (HDTV) signals are formatted according to a standard initially proposed by the Advanced Television Standards Committee (ATSC) and approved by the US Federal Communications Commission (FCC), and all signals carrying HDTV programming are formatted using that standard protocol.

Consumers will want to receive digital signals of these and any other protocols through which digital signals carrying programming is carried. Currently, this requires separate decoders, each embodied in a separate enclosure, such as a set top box, for each desired protocol. This is expensive for the consumer, requires a large amount of space for the various set top boxes, and is inconvenient to use. For example, each set top box may have its own remote control which may be incompatible with those for the other set top boxes. Thus, a transport protocol decoder which can decode different protocols is desirable.

The present inventors have realized that the protocols, such as those described above, each specify a stream of transport packets of different formats, e.g. having different sizes, different framing, different bit arrangement, etc. Further, each of the transport packets carry payloads containing digital data representing signals of different types, such as encoded video or audio, or data. However, the inventors have also realized that the signals represented by the data in the respective payloads for each of the signal types, are the same for all of the protocols. That is, for both of the DSS and ATSC protocols, the encoded video and audio signals are MPEG encoded signals. Consequently, once the payloads have been extracted from the received transport packets, the remainder of the signal processing for such signals is the same regardless of the protocol of the received packets.

In accordance with principles of the present invention, an adaptive transport protocol decoder includes a source of a stream of packets, each including a payload, and having a first transport protocol, and a source of a stream of packets, each including a payload, and having a second transport protocol. A protocol decoder, coupled to the first and second packet stream sources, extracts the respective payloads from the packets from a selected one of the first and second packet stream sources.

Figure 1:
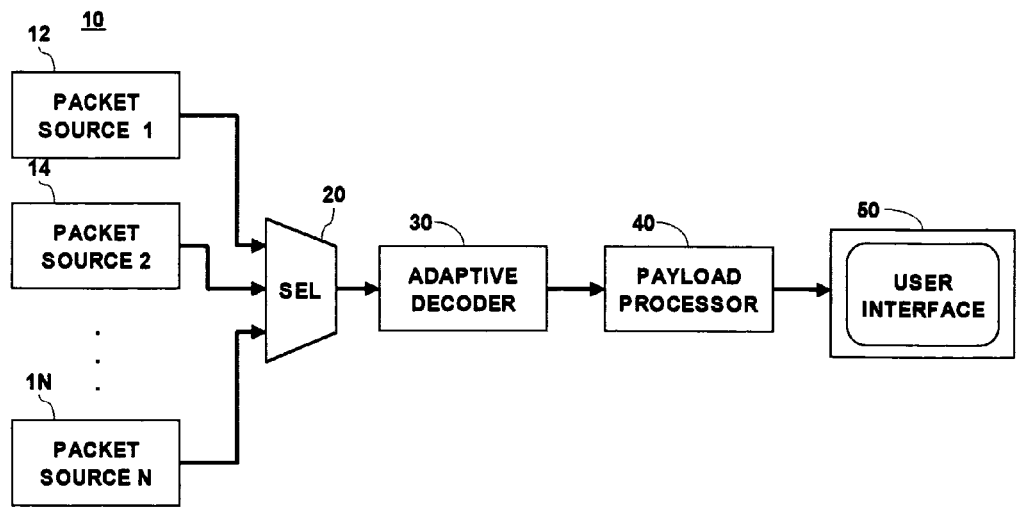
FIG. 1 is a block diagram of a system including an adaptive transport decoder according to the present invention.

FIG. 1 is a block diagram of a system including an adaptive transport decoder according to the present invention. In FIG. 1, respective output terminals of a plurality 10 of sources of streams of packets are coupled to corresponding input terminals of a selector 20. An output terminal of the selector 20 is coupled to an input terminal of an adaptive transport protocol decoder 30. An output terminal of the adaptive transport protocol decoder 30 is coupled to an input terminal of a payload processor 40. An output terminal of the payload processor 40 is coupled to an input terminal of a user interface 50.

In operation, packet source 12 produces a stream of packets each including a payload (described in more detail below) and having a first transport protocol, and packet source 14 produces packets each including a payload and having a second transport protocol. The plurality 10 of packet stream sources may include additional packet stream sources, e.g. packet stream source 1N, producing respective streams of packets each including a payload and having respectively different transport protocols.

For example, the packet source 12 may be the front end of a DSS satellite signal receiver, including a receiving antenna, RF and IF receiver circuitry, tuner, forward error correction (FEC) circuitry, packet error detection and/or correction circuitry (Viterbi or Reed-Solomon decoding, etc.), decryptor and so forth, none of which is germane to the invention, and thus are neither shown nor described in detail. The output from the packet stream source 12 is a stream of packets representing the DSS signal each having the DSS transport packet protocol (format). Similarly, the packet source 14 may be the front end of a terrestrial HDTV signal receiver, including an antenna or cable connection, RF and IF receiver circuitry, error detection and/or correction circuitry and so forth (not shown). The output from the packet stream source 14 is a stream of packets representing the HDTV signal each having the ATSC transport packet protocol.

The selector 20 selects one of the plurality 10 of packet stream sources in response to a control signal from a controller (not shown) and supplies the packet stream from the selected packet stream source to the adaptive transport protocol decoder 30, in a known manner. The adaptive transport protocol decoder 30 analyzes each packet as it is received, and performs appropriate processing of that packet, depending on the transport protocol of the packet, to extract the payload data from the packet in a manner to be described in more detail below. The extracted payload data is supplied to the payload processor 40.

The payload processor 40 processes the payload data to generate a signal corresponding to that data, and supplies that signal to the user interface 50. For example, if the extracted payload data from the adaptive transport protocol adapter 30 is MPEG2 encoded digital video data, then the payload processor 40 includes a known MPEG decoder which decodes the MPEG2 video data according to the MPEG standard to generate a standard video signal (e.g. an NTSC video signal in the US). The video signal is then supplied to the user interface 50, which in this case would be a video monitor, which displays the image represented by the video signal.

Figure 2:
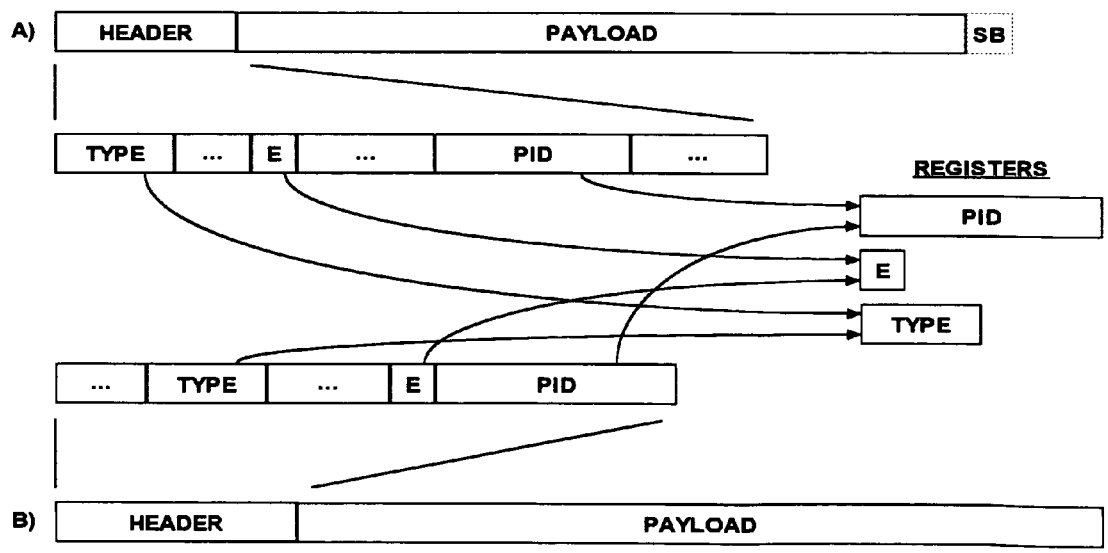
FIG. 2 is a diagram illustrating the format of two packets having different protocols useful in understanding the operation of the adaptive transport decoder of FIG. 1.

FIG. 2 is a diagram illustrating the format of two packets having different protocols. The packets illustrated in FIG. 2 are illustrative only, and not meant to represent a packet of any known protocol. In FIG. 2, a packet having a first protocol is illustrated as a rectangle labeled A), and a packet having a second protocol is illustrated as a rectangle labeled B). The length of the rectangles is an indication of the relative sizes (number of bits) of the packets, and similarly the lengths of the subsections within the packet is an indication of the relative sizes (number of bits) of that subsection. As illustrated in FIG. 2, each of packets A) and B) contains a fixed predetermined number of bits, with the number of bits in packet A) being different from (e.g. less than) the number of bits in packet B). Both packets A) and B) consist of a header, containing control information (described in more detail below), and a payload containing the data carried by the packet. Also as illustrated in FIG. 2, the payloads of packets A) and B) contain a fixed predetermined number of bits, with the number of bits in the payload of packet A) being different from (e.g. less than) the number of bits in the payload of packet B).

The control information in the header is used (among other things) to identify the content of and route the data contained in the packet payload. In FIG. 2, the format of the header information is displayed in expanded form for the packets A) and B). For example, each payload carries data representing a signal of a particular type, e.g. video, audio, data, which must be processed differently from the other types. Control information (TYPE) indicating the type of data in the packet payload is included in the packet headers of the packets A) and B). Also in the packet stream, are data streams carrying data representing a single signal and formed by concatenating the payloads of those packets carrying that data stream. For example, in a DSS channel carrying a television program, there may be several audio signals representing different languages, or several data channels representing closed captioning in different languages, or several video channels representing images from different camera angles or parental approval levels. Each such data stream is identified by a unique packet identifier (PID), which is included in the packet headers for packets A) and B). Further, in order to facilitate pay-per-view channels, the payload data in the packet may or may not be encrypted. Each of the headers of packets A) and B) contain control information (E) to indicate whether the payload data in that packet requires decrypting.

Figure 3:
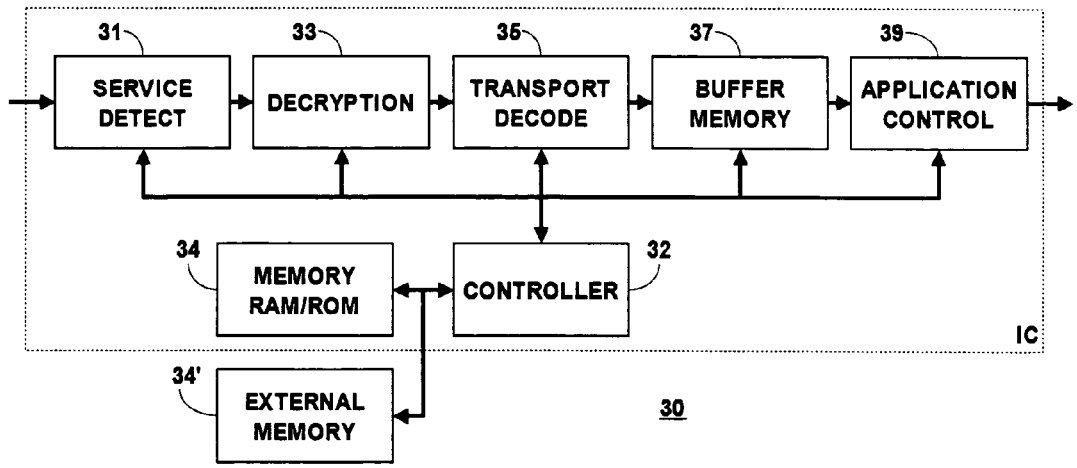
FIG. 3 is a more detailed block diagram of an adaptive transport protocol decoder which may be used in the system illustrated in FIG. 1.

FIG. 3 is a more detailed block diagram of an adaptive transport protocol decoder 30 which may be used in the system illustrated in FIG. 1. The adaptive transport protocol decoder 30 of FIG. 3, includes an input terminal coupled to the output terminal of the selector 20 (of FIG. 1). The input terminal of the adaptive transport protocol decoder 30 is coupled to the series connection of a service detector 31, a decryptor 33, transport decoder 35, buffer memory 37 and application control circuit 39. A controller 32, which may include a microprocessor (not shown), has a control signal output terminal coupled to respective control input terminals of the service detector 31, the decryptor 33, the transport decoder 35, the buffer memory 37 and the application control circuit 39. A memory bus is coupled between the controller 32 and an internal memory 34 (which may include both read/write memory (RAM) and read-only memory (ROM)) and an external memory 34'. The service detector 31, decryptor 33, transport decoder 35, buffer memory 37, application control circuit 39, controller 32 and internal memory 34 may be embodied within an integrated circuit (IC) chip, while the external memory 34' resides outside the IC chip).

In operation, the service detector 31 receives the selected packet stream from the selector 20 (as described above). The service detector 31 detects the start and end of every packet, in a known manner. For an ATSC encoded MPEG2 packet stream, for example, packets are delimited by synchronization bytes having a predetermined value, e.g. 47h, at predetermined locations in the packet stream. Referring to FIG. 2, such a synchronization byte (SB) is illustrated in phantom in packet A) because the synchronization byte SB is not part of the packet itself. The service detector 31 may detect the beginnings and ends of packets using the synchronization bytes. However in DSS packet streams, no synchronization bytes are present. For DSS packet streams, the start and end of packets are detected by means of a synchronization detector in the selected packet stream source 10 which generates a signal to indicate the start of each packet, all in a known manner. For such packet streams, the service detector 31 may use this signal to detect the beginnings and endings of the packets. In the illustrated embodiment a synchronization byte (47h) is inserted between DSS packets by the service detector 31. Because all packets are separated by synchronization bytes, downstream processing will be more uniform for the different protocols.

When each packet has been separated, the service detector 31 then determines if the received packet belongs to a data stream currently being received. For instance, though there may be several audio data streams in the selected packet stream, usually only one or two will be received and further processed. Specifically, in the illustrated embodiment, up to eight data streams may be received. However, one skilled in the art will understand that there is no inherent limit to the number of data streams which may be received simultaneously. As described above, the PID in the header of each packet identifies the data stream to which the packet belongs. The receiver system maintains a set of registers which contain the PIDs of the data streams currently being received and processed. For each received packet, the service detector 31 extracts the PID. As described above, the PID may be placed in a different place, have a different length, and be encoded in a different manner in different protocols. In a manner to be described in more detail below, the service detector 31, in response to a control signal from the controller 32, extracts the PID from the header location appropriate for the protocol of the packet. The extracted PID is stored in a register within the adaptive transport protocol decoder 30. This is illustrated in FIG. 2 by curved lines from the location of the PIDs in packets A) and B) to the PID register. The remainder of the processing to determine whether the data stream carried by this packet is to be further processed operates on the data in the PID register. For example, the PID in the PID register may be compared to the PIDs in the set of registers in the receiver system. If there is a match, the packet is one that is being further processed, and it is then processed by the decryptor 33, otherwise the packet is ignored and the next packet received is processed as described above.

The decryptor 33 extracts the header information indicating whether the payload of this packet is encrypted. As described above, the encryption information E may be placed in a different place, have a different length, and be encoded in a different manner in different protocols. In a manner to be described in more detail below, the decryptor 33, in response to a control signal from the controller 32, extracts the encryption information E from the header location appropriate for the protocol of the packet. Similar to the service detector 31, the extracted encryption information E is stored in a register within the adaptive transport protocol decoder 30, as illustrated by the curved lines from the location of the encryption information E in packets A) and B) to the E register. The remainder of the processing to determine whether the packet needs to be decrypted is performed on the data in the E register. If the encryption information E indicates that the packet requires decrypting, the decryptor 33 decrypts the packet to generate a plain-text packet which may be further processed. Otherwise, the decryptor 33 passes the packet without change to the transport decoder 35.

The transport decoder 35 extracts the payload from the received packet from its location in the received packet. As described above, the payload may be placed in a different place and have a different length in different protocols. The transport decoder 35 places the extracted payload in a buffer memory 37. The application control circuit 39, then, retrieves the buffered payload from the buffer memory and routes them to appropriate payload processing circuitry. In a manner to be described in more detail below, the application control circuit 39, in response to a control signal from the controller 32, extracts the data stream type information TYPE from the header location appropriate for the protocol of the packet. The extracted data stream type information TYPE is stored in a register within the adaptive transport protocol decoder 30, as illustrated by the curved lines from the locations of the data stream type information TYPE in packets A) and B) to the TYPE register. The remainder of the processing to determine where the payload of this packet should be routed is performed on the data in the TYPE register. Specifically, the data in the TYPE register is read and evaluated, and the application control circuit 39 routes the payload to an appropriate processor in the payload processor 40 (of FIG. 3). If, for example, the payload carries MPEG encoded video data, the payload is supplied to an MPEG decoder. If the payload carries closed captioning information, the payload is supplied to an on screen display generator, and so forth.

FIG. 3 illustrates only an exemplary and minimal set of circuitry for processing received transport packets. However, one skilled in the art will understand that other processing may be required to properly decode transport packets. For example, packet streams may include transport packets which carry auxiliary data. Auxiliary data is not payload data part of a data stream, but instead carries status and control information for use by the receiver system itself. In addition, some protocols may allow a combination of payload and auxiliary data in a single transport packet. Further, different protocols may include other information in the header and carry data in respectively different manners, requiring correspondingly different processing. One skilled in the art of decoding transport packets in those protocols will understand what other processing is required by those protocols, what processing elements are necessary to provide that processing, and how to design and implement those processing elements.

Figure 4:
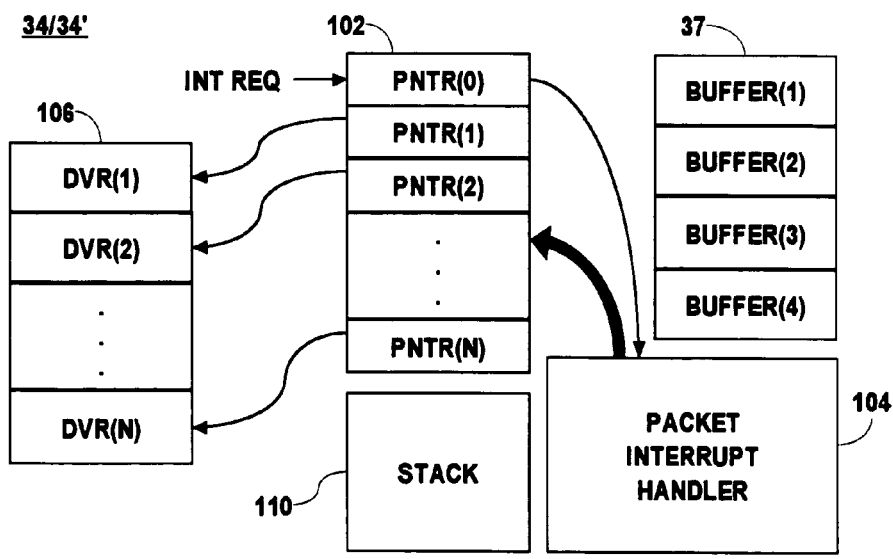
FIG. 4 is a memory layout diagram illustrating the various software components which may be used in an embodiment of an adaptive transport protocol decoder illustrated in FIG. 3.

FIG. 4 is a layout diagram for the memory 34/34' in the adaptive transport protocol decoder 30 illustrated in FIG. 3, illustrating the various software components (storage and code). The arrangement in FIG. 4 is schematic only and is not meant to indicate relative or absolute location or size of the illustrated components, nor their placement in either of the memories 34 or 34'. In FIG. 4, the operation of the adaptive transport protocol adapter 30 is invoked by an external, hardware-generated, interrupt request (INT REQ) signal generated by the selected packet stream source 10 when a packet is available. The interrupt request signal (INT REQ) is supplied to the adaptive transport protocol decoder 30 via the selector 20. This interrupt request signal (INT REQ) is processed by the interrupt mechanism of a microprocessor (not shown) embodied in the controller 32. The interrupt request (INT REQ) signal causes the microprocessor to interrupt its processing, and to immediately begin processing of a packet handler 104 at a memory location pointed to by an interrupt pointer PNTR(0) associated with the external hardware interrupt request signal (INT REQ) in an interrupt vector 102 stored at a predetermined fixed location in the memory, all in a known manner. The interrupt pointer PNTR(0) contains a memory location of the packet (interrupt) handler 104 which is designated to process this interrupt. The interrupt handler 104 performs the processing necessary to determine if the available packet is to be further processed, to decrypt the packet if necessary, extract the payload, and store the extracted payload in a buffer until it can be further processed, (and any other required processing) as described above. It would also be possible for processing of a newly available packet to be initiated by status polling by the microprocessor, or any other of known methods.

When the microprocessor (not shown) is interrupted in this manner, the current state of the microprocessor program execution (program counter, registers, flags, etc.) are pushed onto a stack 110, and the interrupt routine 104 pointed to by the interrupt pointer PNTR(0) in the interrupt vector 102 is executed starting at the address in the pointer PNTR(0). Because this is a rapid way to switch program environments, the interrupt process described above may also be invoked via a software instruction, termed a software interrupt, in time critical applications. For example, a routine DVR(1) may be invoked by a software interrupt calling the routine pointed to by the interrupt pointer PNTR(1); a routine DVR(2) may be invoked by a software interrupt calling the routine pointed to by the interrupt pointer PNTR(2), and so forth. In FIG. 4, the interrupt handler 104 invokes the various driver routines 106 via software interrupts directed to the appropriate interrupt pointers PNTR(x) in the interrupt vector 102. This is indicated in FIG. 4 via a thick arrow from the interrupt handler 104 to the interrupt vector 102. It is further possible (though not illustrated in FIG. 4 to simplify the drawing) for driver routines DVR(x) to call other driver routines DVR(x) through software interrupts specifying the interrupt pointer PNTR(x) in the interrupt vector 102 of the desired driver routine DVR(x).

In FIG. 4, the buffer memory 37 includes sufficient memory (BUFFER(1) through BUFFER(4)) for four extracted payloads. As a payload is extracted from a packet, it is stored in the next available buffer and the payload processor 40 appropriate for that payload is notified of the location in the buffer memory 37 of the payload. In response, the payload processor 40 retrieves the payload from its buffer, and processes it in an appropriate manner.

In the illustrated embodiment, the adaptive transport protocol decoder 30 and its memory 34/34' are able to be configured to process either DSS transport protocol packets, or ATSC transport protocol packets. The design and implementation of an interrupt handler 104 and driver routines 106 necessary to process DSS protocol packets; the instructions making up the interrupt handler 104 and driver routines 106; and the addresses of the interrupt handler 104 and the driver routines 106 for the interrupt vector 102, are all known and will not be described in detail. In addition, the size of the buffers in the buffer memory 37 is also known: the payload of DSS transport packets are 127 bytes in length. Similarly, the particular routines necessary to process ATSC protocol packets, the instructions making up the interrupt handler 104 and the driver routines 106, the addresses of the interrupt handler 104 and the driver routines 106 for the interrupt vector 102 are all known and will not be described in detail. In addition, the size of the buffer memory 37 is also known: the payload of ATSC transport packets are 184 bytes in length.

Figure 5:
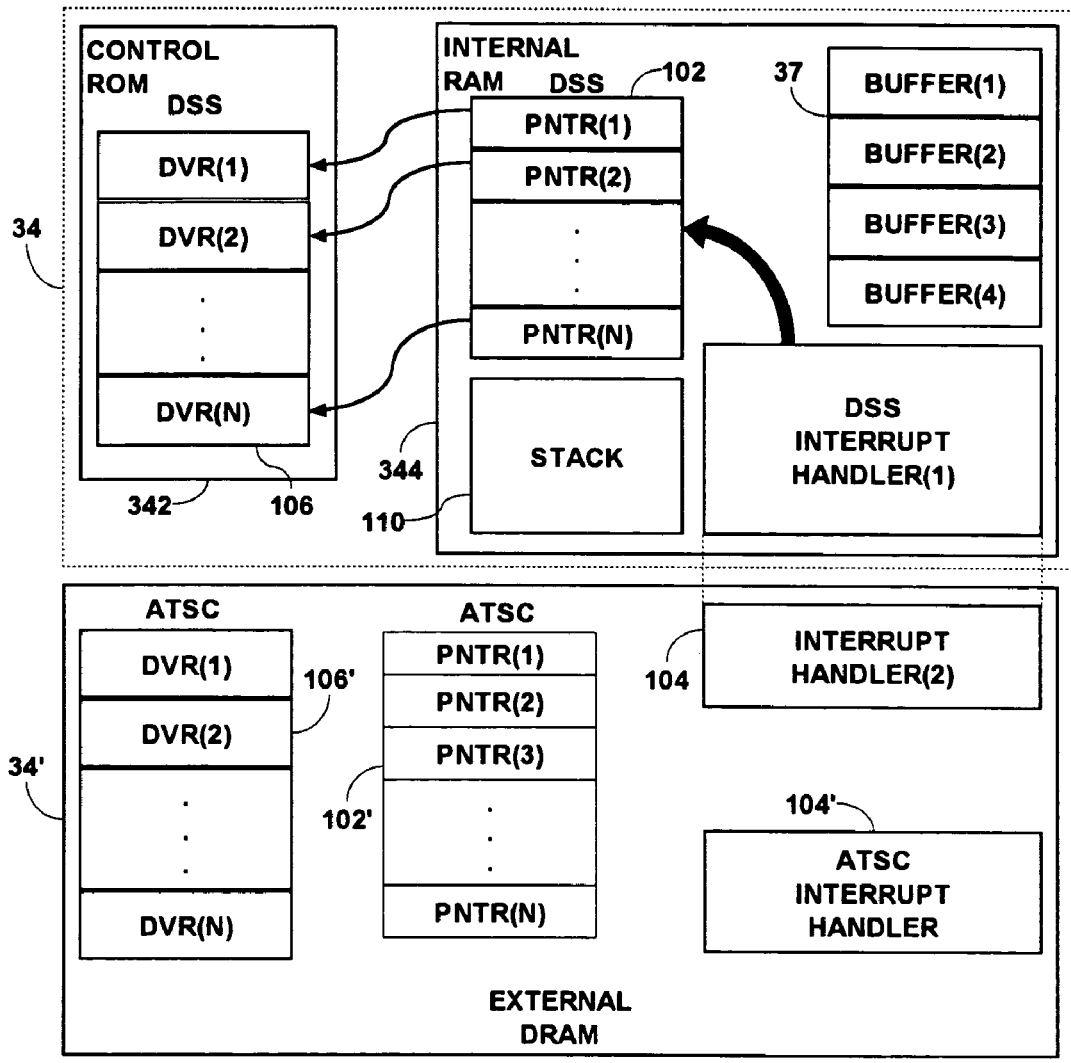
FIG. 5 is a memory layout diagram illustrating the various software components illustrated in FIG. 4 arranged for processing DSS transport protocol packets.

FIG. 5 is a memory layout diagram illustrating the various software components illustrated in FIG. 4 arranged for processing DSS transport protocol packets. In FIG. 5, those elements which are the same as those illustrated in FIG. 4 are designated by the same reference number and are not described in detail.

As in FIG. 4, the arrangement in FIG. 5 is schematic only and is not meant to indicate relative or absolute location or size of the illustrated components.

There is a limited amount of memory 34 internal to the adaptive transport protocol decoder 30 IC chip. Thus, some portion of the software components must be located in the external memory 34'. In FIG. 5, the DSS driver routines DVR(1) through DVR(N) are located in the control read-only memory (ROM) 342 of the internal memory 34. The DSS vector table 102, stack 110 and payload buffers 37 are located completely in the internal RAM 344 of the internal memory 34. Due to memory size constraints, however, only a portion of the DSS interrupt handler 104(1) is located in the internal RAM 344. The remainder of the DSS interrupt handler 104(2) is located in the external dynamic RAM (DRAM) 34'. As described above, the design, implementation and operation of the DSS software components to decode DSS protocol transport packets is known, and will not be described here.

It may also be seen in FIG. 5 that the ATSC interrupt vector 102', software interrupt drivers 106' and interrupt handler 104' for controlling the operation of the adaptive transport protocol decoder 30 when decoding ATSC transport packets are stored in the external DRAM 34', but are not utilized.

In operation, when the DSS interrupt handler 104 is invoked by an external interrupt signal (not shown). The DSS interrupt handler 104 invokes appropriate DSS driver routines 106 to process the received transport packet, extracting data from the header, decrypting the payload if necessary, storing the payload in one of the buffers 37, and notifying the appropriate payload processor 40 under control of the controller 32, as described above, all in a known manner.

Figure 6:
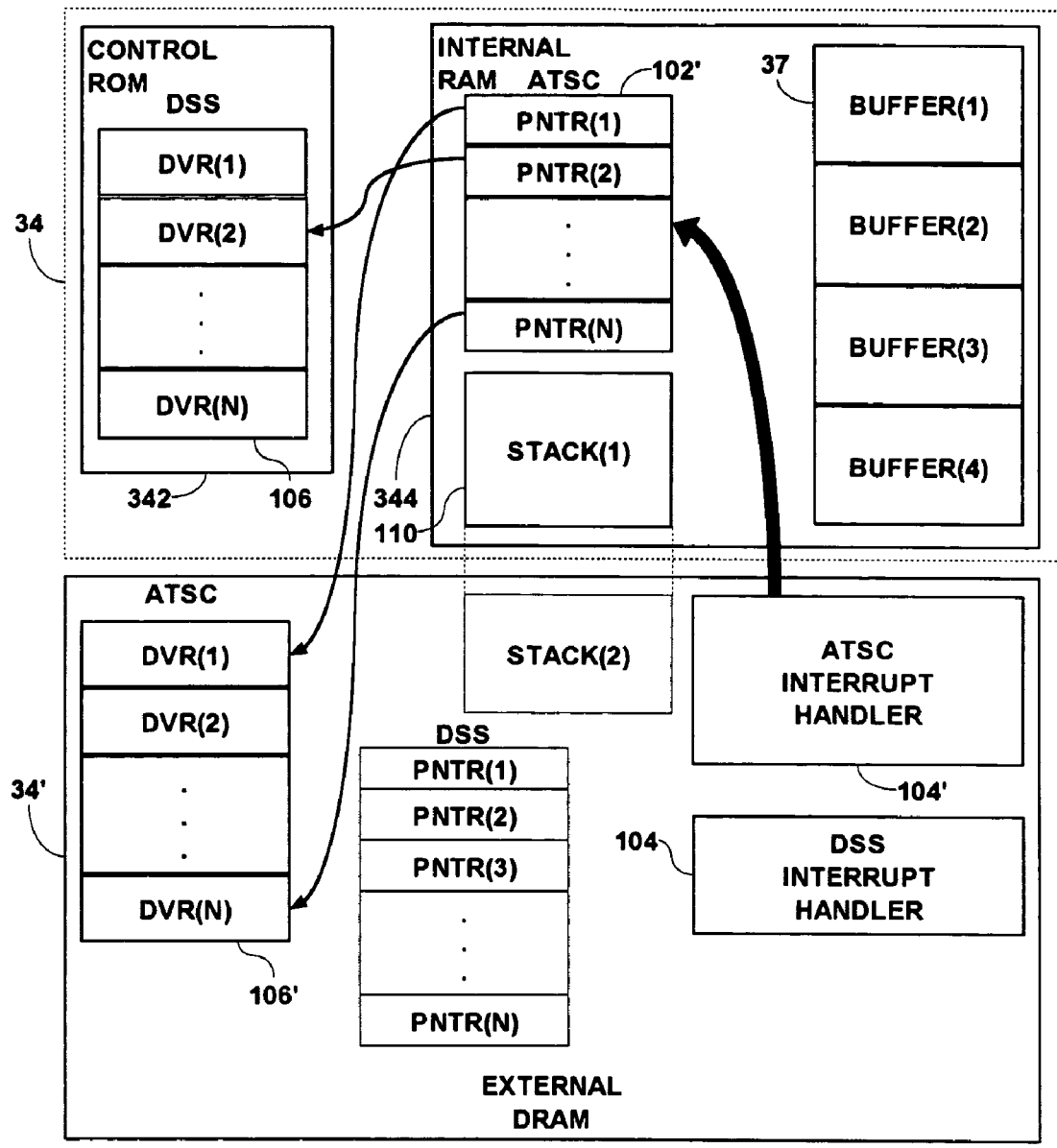
FIG. 6 is a memory layout diagram illustrating the various software components illustrated in FIG. 4 arranged for processing ATSC transport protocol packets.

FIG. 6 is a memory layout diagram illustrating the various software components illustrated in FIG. 4 arranged for processing ATSC transport protocol packets. In FIG. 6, those elements which are the same as those illustrated in FIGS. 4 and 5 are designated by the same reference number and are not described in detail. As in FIGS. 4 and 5, the arrangement in FIG. 6 is schematic only and is not meant to indicate relative or absolute location or size of the illustrated components.

As in FIG. 5, some portion of the software components must be located in the external memory 34'. In FIG. 6, the interrupt vector 102', and payload buffers 37 are located completely in the internal RAM 344 of the internal memory 34. Due to memory size constraints, however, only a portion of the stack 110(1) is located in the internal RAM 344. The remainder of the stack 110(2) is located in the external DRAM 34'. The ATSC interrupt handler 104' and ATSC driver routines 106' are completely located in the external DRAM 34'. As described above, the design, implementation and operation of the ATSC software components to decode ATSC protocol transport packets is known, and will not be described here.

It may also be seen in FIG. 6 that the DSS interrupt drivers 106 remain located in the control ROM 342 in the internal memory 34. The DSS interrupt vector 102 and interrupt handler 104 are stored in the external DRAM 34'. None of these are utilized.

In operation, when the ATSC interrupt handler 104 is invoked by an external interrupt signal (not shown). The ATSC interrupt handler 104 invokes the appropriate interrupt drivers to process the received transport packets, extracting data from the header, decrypting the payload if necessary, storing the payload in one of the buffers 37, and notifying the appropriate payload processor 40 under control of the controller 32, as described above, all in a known manner.

It is also possible for an interrupt driver in the DSS interrupt drivers 106 in the control ROM 342 of the internal memory 34 to perform a function which is required when decoding ATSC transport packets. In FIG. 6, the ATSC interrupt pointer PNTR(2) points to an interrupt driver DVR(2) in the DSS interrupt driver set 106. The function of this driver, consequently, need not be recreated in the ATSC interrupt driver set 106'. For example, as described above, information is extracted from the header of a packet and placed in registers for further processing. An interrupt driver DVR(n) may process a payload type by accessing that register regardless of where the information came from in the header. Such an interrupt driver DVR(n) may then be shared among all the protocols which the adaptive transport protocol decoder 30 is designed to process. More specifically, as described above, the PID is extracted from the header of the packet and placed in the PID register. The contents of that register is then compared to a table of PIDs identifying data streams currently being received. Once the PID has been extracted from the header of the packet and placed in the register, the interrupt driver which compares the PID in the register to the table of PIDs can be shared among all the transport packet protocol control programs.

Figure 7:
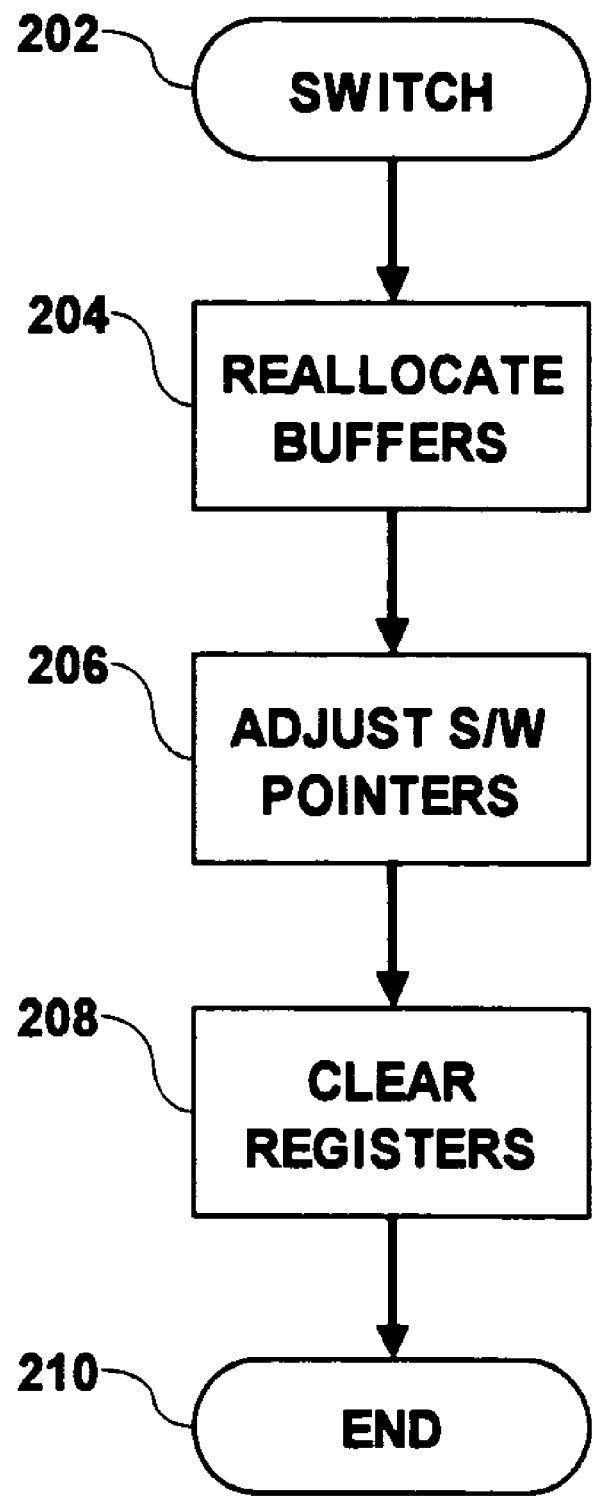
FIG. 7 is a flow chart illustrating the process of switching modes between decoding DSS transport packets to decoding ATSC transport packets.

FIG. 7 is a flow chart illustrating the process of switching modes between decoding DSS transport packets to decoding ATSC transport packets. A switch between decoding DSS transport packets and ATSC transport packets may be initiated by any of a variety of known manners. For example, referring to FIG. 1, under user control, the user selects a packet stream whose programming it is desired to watch. If the packet stream source 12 produces packets in DSS protocol, then when packet stream source 12 is coupled to the adaptive transport protocol decoder 30 by the selector 20, the adaptive transport packet decoder is simultaneously configured to decode DSS transport packets. If the packet stream source 14 produces packets in the ATSC protocol, then when packet stream source 14 is coupled to the adaptive transport protocol decoder 30 by the selector 20, the adaptive transport protocol decoder 30 is simultaneously configured to decode ATSC transport packets. Alternatively, several on-line program directories exist, which can carry the protocol of the listed programs. When a program is selected, the directory is consulted and the adaptive transport protocol decoder 30 is configured accordingly. Other methods are also available for configuring the adaptive transport protocol decoder 30.

In FIG. 7, a switch of protocols is initiated in step 202. In step 204, memory is reallocated for the payload buffers 37. For example, DSS payload buffers contain 127 bytes and ATSC payload buffers contain 184 bytes. In step 206, the software (S/W) pointers are adjusted. In the illustrated embodiment, when the adaptive transport protocol decoder 30 is configured to decode DSS packets, the DSS interrupt vector 102 (stored in the external DRAM 34' while the adaptive transport protocol decoder 30 is configured to process ATSC transport packets) is moved to the internal RAM 344 of the internal memory 34, while the ATSC interrupt vector 102' is simultaneously moved from the internal RAM 344 to the external DRAM 34'. Then memory is allocated for the stack 110. Finally, the portion of the DSS interrupt handler 104(1) which is to be located in the internal RAM 344 of the internal memory 34 is moved to its allocated location.

Conversely, when the adaptive transport protocol decoder 30 is configured to decode ATSC packets, the ATSC interrupt vector 102' (stored in the external DRAM 34' while the adaptive transport protocol decoder 30 is configured to process DSS transport packets) is moved to the internal RAM 344 of the internal memory 34, while the DSS interrupt vector 102 is simultaneously moved from the internal RAM 344 of the internal memory 34 to the external DRAM 34'. Then memory is allocated for the portion of the stack 110(1) which is to be located in the internal RAM 344 of the internal memory 34.

In step 208, the registers (of FIG. 1) which hold various information extracted from the headers of the received packets are cleared. In step 210, the switch process is completed, and the adaptive transport protocol decoder 30 is ready to decode packets in the newly selected protocol.

The adaptive transport protocol decoder 30 has been described in terms of two transport protocols: DSS and ATSC. One skilled in the art will understand that additional protocols may be implemented by appropriate design and coding of an interrupt handler 104 and interrupt drivers 106 to process headers and extract payloads from packets of those protocols, and then reconfiguring the adaptive transport protocol decoder 30 to use the appropriate interrupt handler 104 and interrupt drivers 106 via coding of the interrupt vector 102 for that protocol. Use of software interrupts for performing the required processing produces fast context switching, and fast and easy reconfiguration of the adaptive transport protocol adapter 30.

What is claimed is:

1. An adaptive transport decoder, comprising:
a plurality of sources of respective streams of packets, each stream including a payload, and having a different respective transport protocol;
a protocol decoder for extracting the respective payloads from the packets from each selected one of the packet stream sources according to said respective different transport protocols;
a selector, having respective input terminals coupled to each of the respective packet stream sources, and an output terminal coupled to the protocol decoder, and responsive to a select signal for selectively coupling each one of said packet stream sources to the protocol decoder by means of said output terminal; and
wherein the protocol decoder comprises a processor, responsive to a corresponding plurality of respective control programs for processing the packets from said packet stream sources according to their respective transport protocols to extract the respective payloads, and a further control program for switching between said respective control programs for processing the packets.

2. An adaptive transport decoder, comprising:
a source of a first stream of packets, each including a payload, and having a first transport protocol;
a source of a second stream of packets, each including a payload, and having a second transport protocol, wherein said second transport protocol is different than said first transport protocol;
a protocol decoder, coupled to the first and second packet stream sources, for extracting the respective payloads from the packets from a selected one of the first and second packet stream sources according to said respective different first and second transport protocols; and
a selector, having respective input terminals coupled to the first and second packet stream sources, and an output terminal coupled to the protocol decoder, and responsive to a select signal for selectively coupling either one of the first and second packet stream sources to the protocol decoder;
wherein the protocol decoder comprises a processor, responsive to a first control program for processing the packets from the first packet stream source according to said first transport protocol to extract the respective payloads, a second control program for processing the packets from the second packet stream source according to said second transport protocol to extract the respective payloads, and a third control program for switching between the first control program and the second control program.

3. An adaptive transport decoder comprising:
a source of a first stream of packets, each including a payload, and having a first transport protocol;
a source of a second stream of packets, each including a payload, and having a second transport protocol, wherein said second transport protocol is different than said first transport protocol;
a protocol decoder, coupled to the first and second packet stream sources, for extracting the respective payloads from the packets from a selected one of the first and second packet stream sources according to said respective different first and second transport protocols; and
a selector, having respective input terminals coupled to the first and second packet stream sources, and an output terminal coupled to the protocol decoder, and responsive to a select signal for selectively coupling either one of the first and second packet stream sources to the protocol decoder;
wherein the protocol decoder comprises a processor, responsive responsive to a first control program for processing the packets from the first packet stream source according to said first transport protocol to extract the respective payloads, a second control program for processing the packets from the second packet stream source according to said second transport protocol to extract the respective payloads, and a third control program for switching between the first control program and the second control program; and wherein:
the processor includes a memory for storing the first, second and third programs; and each of the first and second control programs comprises:
a packet handler; executed in response to each received packet;
a plurality of interrupt drivers, stored in the memory at respective locations, called by software interrupt;
an interrupt vector, stored at a fixed, predetermined location in memory, including a plurality of entries, each containing a pointer to a respective location of an interrupt driver.

4. The adaptive transport decoder of claim 3 wherein:
the third control program switches between the first and second control programs by moving the interrupt vector of one of the first and second control programs to the fixed predetermined location in the memory, and simultaneously moving the interrupt vector of the other one of the first and second control programs to another location in the memory.

5. The adaptive transport decoder of claim 3 wherein each of the first and second control programs further comprises a buffer for storing the respective extracted payloads at a location in the memory.

6. The adaptive transport decoder of claim 5 wherein:
the third control program switches between the first and second control programs by moving the interrupt vector of one of the first and second control programs to the fixed predetermined location in the memory, and simultaneously moving the interrupt vector of the other one of the first and second control programs to another location in the memory; and
reallocating the buffer to a location in the memory.

7. The adaptive transport decoder of claim 3 wherein:
the packet handler is an interrupt handler stored in the memory at a location; and
one of the entries in the interrupt vector points to the location of the packet handler.

8. The adaptive transport decoder of claim 7 wherein:
each of the first and second packet stream sources generates an interrupt request signal when a packet is available;
the entry in the interrupt vector pointing to the location of the packet handler is responsive to the interrupt signal from the selected packet stream source.

9. An adaptive transport decoder comprising:
a source of a first stream of packets, each including a payload, and having a first transport protocol;
a source of a second stream of packets, each including a payload, and having a second transport protocol, wherein said second transport protocol is different than said first transport protocol; and
a protocol decoder for extracting the respective payloads from the packets from either selected one of the first and second packet stream sources according to said respective different first and second transport protocols; and further comprising:
a selector, having respective first and second input terminals coupled to the first and second packet stream sources, and an output terminal coupled to the protocol decoder, and responsive to a select signal for selectively coupling either one of the first and second packet stream sources to the protocol decoder; and wherein:
said protocol decoder further comprises a processor responsive to first, second and third control programs, the third control program is responsive to the select signal to switch to the first control program for processing according to said first transport protocol when the first packet stream source is coupled to the protocol decoder and to switch to the second control program for processing according to said second transport protocol when the second packet stream source is coupled to the protocol decoder.

10. An adaptive transport decoder comprising:
a source of a first stream of packets, each including a payload, and having a first transport protocol;
a source of a second stream of packets, each including a payload, and having a second transport protocol, wherein said second transport protocol is different than said first transport protocol;
a protocol decoder, coupled to the first and second packet stream sources, for extracting the respective payloads from the packets from either selected one of the first and second packet stream sources according to said respective different first and second transport protocols; and
a payload processor coupled to the protocol decoder for processing the respective payloads extracted from the packets from the selected packet stream source in accordance with said respective first and second transport protocols; wherein
said processor is responsive to a first control program for processing the packets from the first packet stream source according to said first transport protocol to extract the respective payloads, a second control program for processing the packets from the second packet stream source according to said second transport protocol to extract the respective payloads, and a third control program for switching between the first control program and program and the second control program.

11. An adaptive transport decoder comprising:
a source of a first stream of packets, each including a payload, and having a first transport protocol;
a source of a second stream of packets, each including a payload, and having a second transport protocol, wherein said second transport protocol is different than said first transport protocol;
a protocol decoder for extracting the respective payloads from the packets from either selected one of the first and second packet stream sources according to said respective different first and second transport protocols;
a selector responsive to a select signal for selectively coupling either one of the first and second packet stream sources to the protocol decoder;
wherein the protocol decoder comprises a processor, responsive to a first control program for processing the packets from the first packet stream source according to said first transport protocol to extract the respective payloads, a second control program for processing the packets from the second packet stream source according to said second transport protocol to extract the respective payloads, and a third control program for switching between the first control program and the second control program; and wherein:
each packet in the first and second packet streams further comprises a header containing information related to the payload;
the protocol decoder comprises a register for storing information from a header of a received packet; and
the protocol decoder accesses the register to obtain the information for processing said packets according to said respective first and second transport protocols.

* * * * *